United States Patent
Brint

[11] Patent Number: 6,138,706
[45] Date of Patent: Oct. 31, 2000

[54] CONDENSATE TRAPS

[75] Inventor: Michael John Brint, Gloucester, United Kingdom

[73] Assignee: Spirax-Sarco Limited, Cheltenham, United Kingdom

[21] Appl. No.: 09/311,389

[22] Filed: May 13, 1999

[30] Foreign Application Priority Data

May 13, 1998 [GB] United Kingdom .................. 9810240

[51] Int. Cl.[7] .................................................. F16K 37/00
[52] U.S. Cl. .............................. 137/183; 137/558; 236/94
[58] Field of Search .................................... 137/183, 558; 236/94

[56] References Cited

U.S. PATENT DOCUMENTS 5,069,247 12/1991 Föller ...................................... 137/558

FOREIGN PATENT DOCUMENTS 2 231 407 11/1990 United Kingdom .

Primary Examiner—Gerald A. Michalsky
Attorney, Agent, or Firm—Duane, Morris & Heckscher, LLP

[57] ABSTRACT

A condensate trap comprises a trap element 12 disposed in a trap chamber 6, and a sensor chamber 16 containing a sensor element 24 for monitoring the performance of the trap element 12. The sensor chamber 16 communicates with the trap chamber 6 through a first passageway 26 and one or more second passageways 28. The first passageway 26 opens into the sensor chamber 16 at an upper region of the sensor chamber, while the second passageway 28 opens at a lower region, so that the sensor element 24 is situated at a level above the lowermost part of the port at which the second passageway 28 opens into the sensor chamber 16. If the trap element 12 does not close the outlet 10 properly, condensate accumulating in the sensor chamber 16 will be forced into the trap chamber 6 through the second passageway 28, and the level will fall to expose the sensor element 24 which will react to provide an alarm signal.

21 Claims, 3 Drawing Sheets

CONDENSATE TRAPS

BACKGROUND OF THE INVENTION AND PRIOR ART

This invention relates to condensate traps.

GB-A-2256472 discloses a condensate trap comprising a trap chamber having an outlet controlled by a valve, and a sensor chamber having an inlet, the sensor chamber communicating with the trap chamber through a first passageway, which opens into the sensor chamber at a first port in an upper region of the sensor chamber, and through a second passageway which opens into the sensor chamber at a second port situated in the sensor chamber at a lower level than the first port, a sensor being provided which has a sensor element situated within the sensor chamber at a level which is not lower than the lowest part of the second port.

The sensor chamber comprises the interior of a square cross-section tube fitted into a cylindrical cavity. The first and second ports are defined by clearances between the upper and lower ends, respectively, of the tube and the wall of the cavity. In normal operation of the condensate trap, the sensor chamber contains condensate, and so the sensor element is submerged. If leakage occurs past the valve, the resulting pressure difference causes the condensate to be forced past the lower end of the sensor tube and into the trap chamber, with the result that the sensor element is exposed to steam, and so provides an alarm signal.

A disadvantage of the device described in GB-A-2256472 is that the square cross-section tube is itself a specially manufactured component, and requires complex measures to locate its lower end. Also, the first and second passageways communicate with the trap chamber through a common port, which means that it is difficult to control the relationship between the flow cross-sections of the two passageways.

SUMMARY OF THE INVENTION

According to one aspect of the present invention a condensate trap is provided which comprises a trap chamber having an outlet controlled by a valve, and a sensor chamber having an inlet. The sensor chamber communicates with the trap chamber through a first passageway, which opens into the sensor chamber at a first port in an upper region of the sensor chamber. The sensor chamber also communicates with the trap chamber through a second passageway which opens into the sensor chamber at a second port situated in the sensor chamber at a lower level than the first port. A sensor is provided which has a sensor element situated within the sensor chamber at a level which is not lower than the lowest part of the second port. The first and second passageways open into the trap chamber at separate locations from each other.

Preferably, the sensor chamber is situated directly below the trap chamber, in the normal orientation of the condensate trap in use. In such a case, the first and second passageways may extend vertically, and independently of each other, between the sensor chamber and the trap chamber.

The inlet, the outlet, the first and second passageways and the sensor chamber may be formed in a common body. A cap may be secured to the body to define the trap chamber.

The inlet and the outlet may have passages which are aligned with each other, and open at opposite ends of the body so that the condensate trap may be installed in a pipeline.

The sensor chamber may be of generally cylindrical form and, if the inlet and outlet have aligned passages, the axis of the sensor chamber may intersect the common axis of the inlet and outlet passages at an acute angle. The sensor chamber may have an opening at its lower end in which a mounting assembly for the sensor is received.

There may be more than one second passageway; for example, there may be two second passageways opening at ports disposed on opposite sides of the sensor chamber.

According to a second aspect of the present invention, a perforated screen is provided in the sensor chamber in the flow path between the inlet and the or each second port.

DETAILED DESCRIPTION OF PREFERRED EMBODIMENTS

Figure 1:
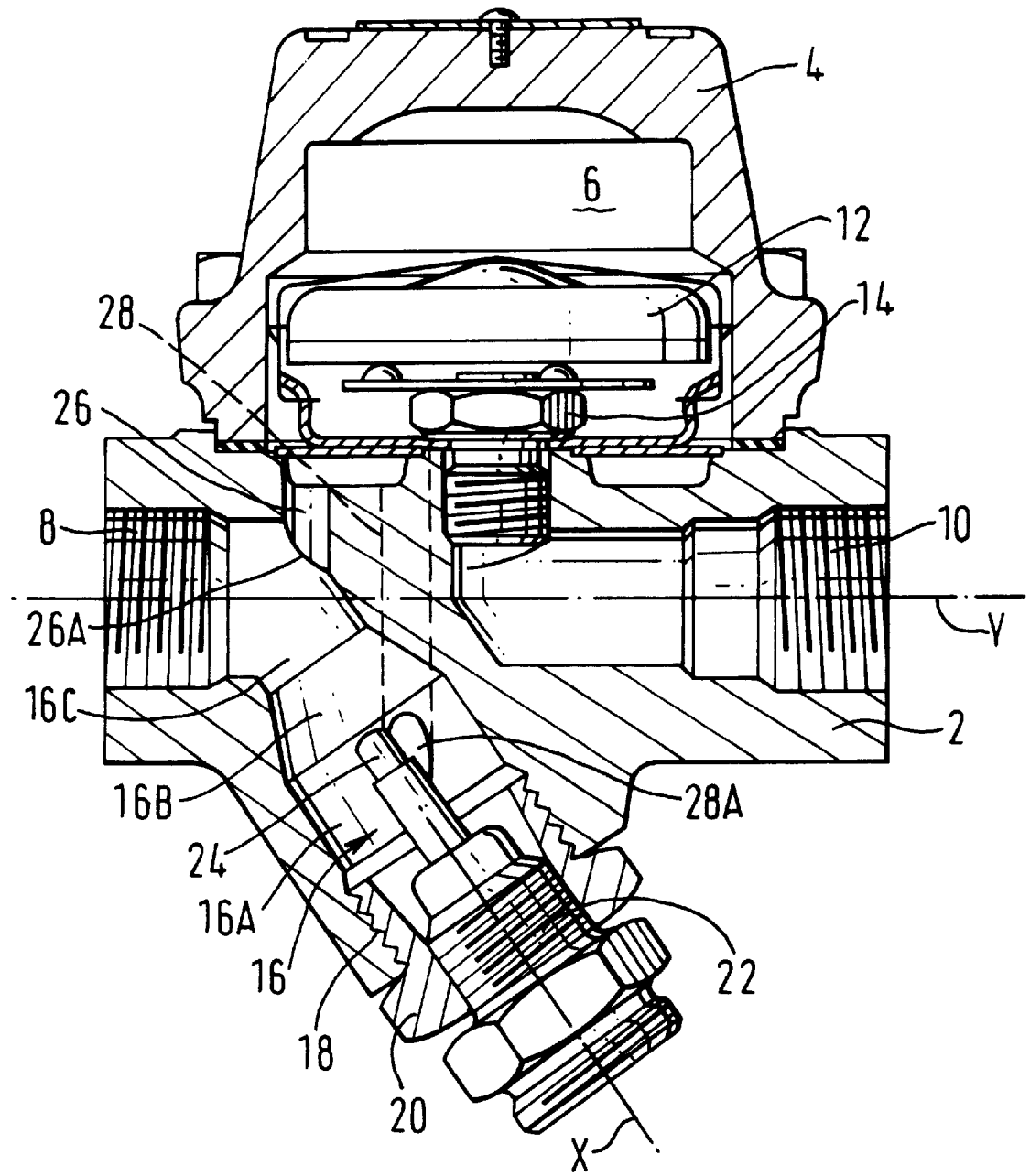
FIG. 1 is a sectional view of a condensate trap.

The condensate trap shown in FIG. 1 comprises a body 2 and a cap 4 which is bolted to the body 2 to provide a trap chamber 6. The body has an inlet passage 8 and an outlet passage 10. A trap element 12 is mounted within the trap chamber 6 and cooperates with a seat 14 to provide a valve which can open and close an entrance to the outlet passage 10.

A sensor chamber 16 is formed in the body 2. The sensor chamber comprises a cylindrical main region 16A, a tapering region 16B and a smaller diameter inlet region 16C into which the inlet 8 opens. It will be appreciated from FIG. 1 that the sensor chamber 16 is situated directly below the trap chamber 6, the centre line X of the sensor chamber intersecting at an acute angle the common centre line Y of the inlet and outlet passages 8 and 10 which emerge at opposite ends of the body 2. The angle of intersection is approximately 55°. The lower end of the sensor chamber 16 has a screw thread 18 which receives a fitting 20 to close the lower end of the sensor chamber 16. A sensor 22 is secured to the fitting 20 and has a sensor element 24 which is situated on the axis of the sensor chamber 16.

The sensor chamber 16 communicates with the trap chamber 6 through a first passageway 26 and a pair of second passageways 28. The first passageway 26 opens into the inlet region 16C of the sensor chamber 16 at a first port 26A. The second passageways 28 open into the main region 16A of the sensor chamber 16 at respective second ports 28A.

Figure 2:
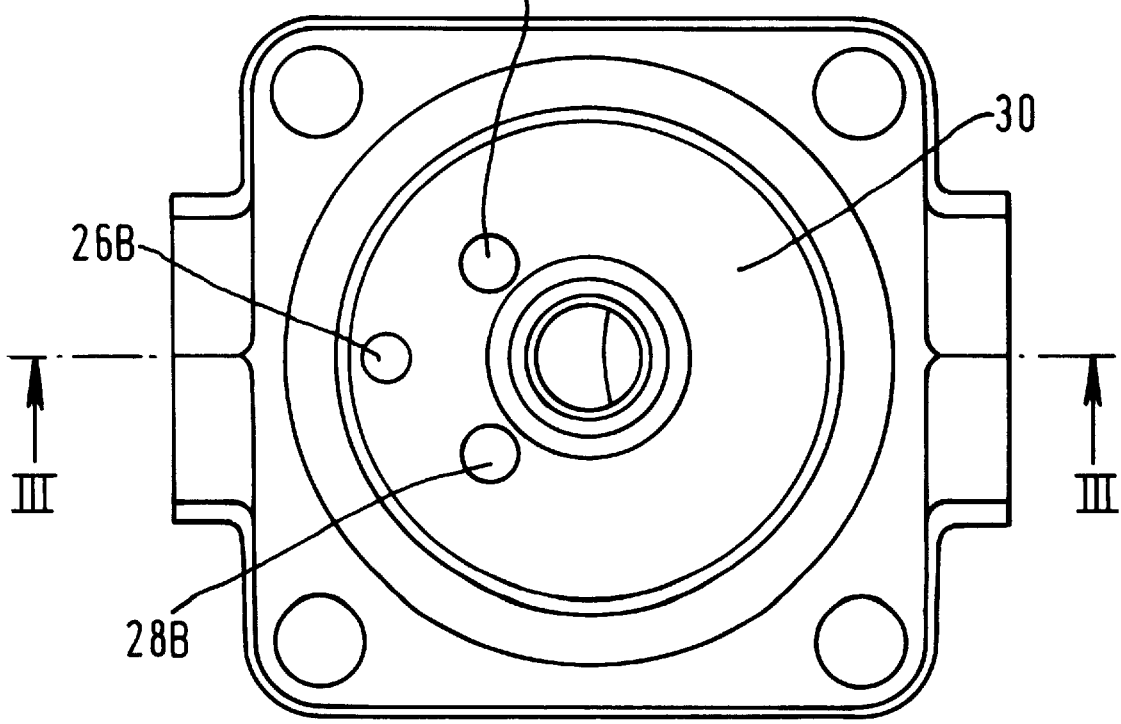
FIG. 2 is a plan view of a body component of the trap of FIG. 1.

It will be appreciated from FIG. 2 that the body has a circular face 30 which constitutes the lower wall of the trap chamber 6. The first passageway 26 and the two second passageways 28 emerge into the trap chamber 6 at respective ports 26B and 28B in the surface 30.

The first port 26A at which the first passageway 26 opens into the sensor chamber is situated in the upper region of the sensor chamber and, in the embodiment illustrated, is at the very top of the sensor chamber 16. The ports 28A at which the second passageways 28 open into the sensor chamber 16 are at a level below that of the first port 26A, and are in the lower region of the sensor chamber 16. The sensor element 24 is positioned at level similar to that of the ports 28A of the second passageways 28, but above the lowermost extremity of those ports.

In normal operation of the condensate trap shown in the Figures, condensate enters the trap through the inlet 8 and accumulates in the sensor chamber 16. As condensate accumulates, the temperature in the trap chamber 6 will fall. The trap element 12 is sensitive to temperature, and eventually the falling temperature will cause the trap element 12 to move off the seat 14, so opening the outlet 10. Steam pressure upstream of the condensate trap will then force the condensate through the passageways 26 and 28 into the trap chamber 6 and thence through the outlet 10. When all of the condensate has been discharged, steam will enter the trap chamber 6 so raising the temperature and causing the trap element to close against the seat 14 to shut off the escape of steam.

If the trap element 12 seats unsatisfactorily against the seat 14, the trap will not close properly, and steam will continue to leak out of the trap chamber 6 to the outlet 10. If the leak is minor, it will not affect the build-up of condensate in the sensor chamber 16, but will be accommodated by flow through the first passageway 26. The sensor element 24 will therefore remain submerged in condensate, and the output signal from the sensor 22 will reflect normal operation.

If leakage becomes severe, a pressure drop will build up between the sensor chamber 16 and the trap chamber 6, and this will force condensate from the sensor chamber 16 through the second passageways 28 into the trap chamber 6. As a result, the level of condensate in the sensor chamber 16 will fall below the level of the sensor element 24, which will become exposed to hot steam. The sensor 22 will therefore generate an output signal reflecting a state of leakage, and so can cause an alarm to be given.

Figure 4:
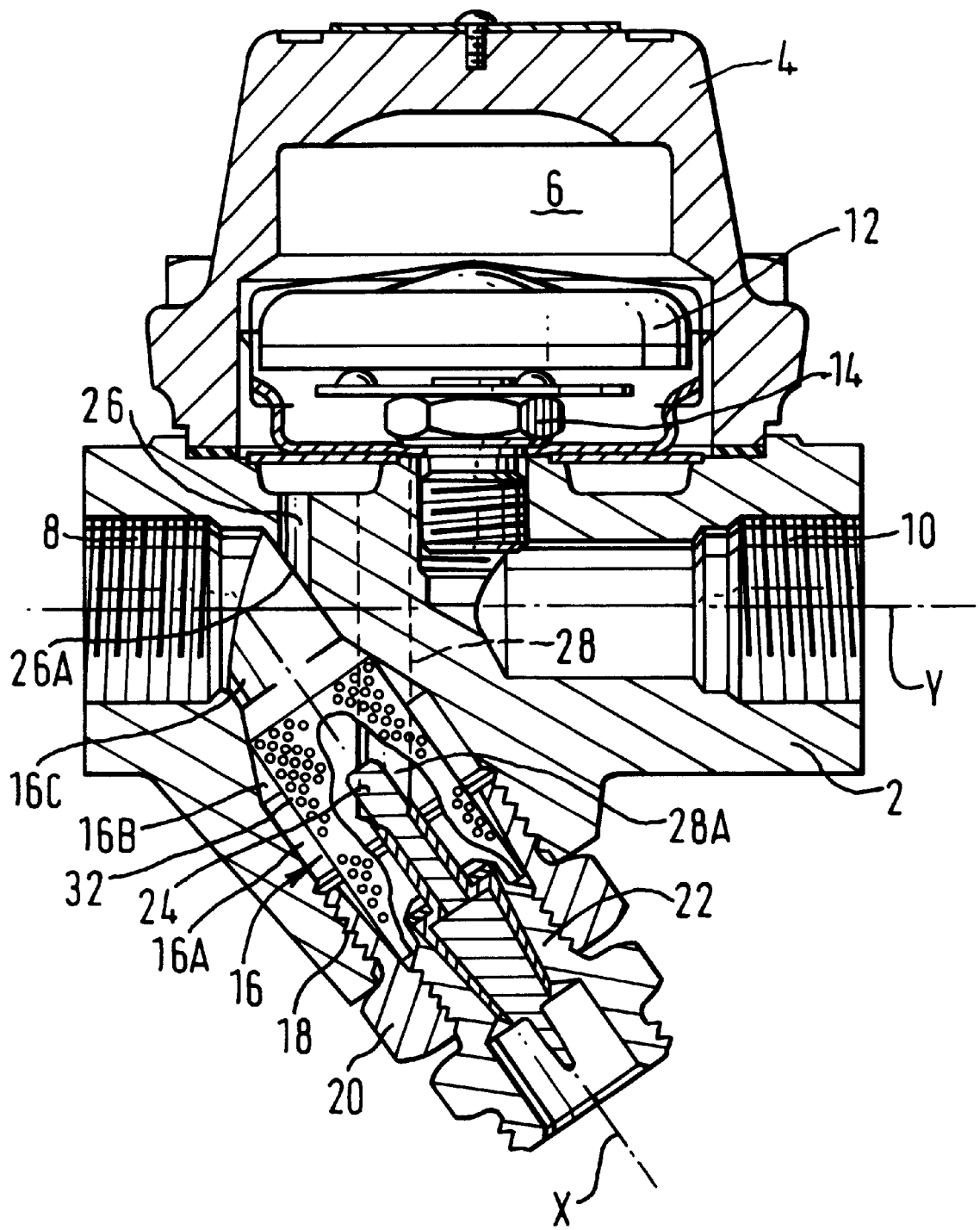
FIG. 4 corresponds to FIG. 1 but shows an alternative embodiment.

FIG. 4 shows an alternative embodiment which exhibits improved sensitivity in operation. Much of the embodiment of FIG. 4 is identical to that of FIG. 1, and corresponding components are represented by the same reference numbers.

In FIG. 4 a perforated screen 32 is situated in the sensor chamber 16. The screen 32 is cylindrical and is perforated by a large number of small holes. The screen 32 is located between the tapering region 16B and the sensor 22, with the result that all condensate flow between the inlet 8 and the second flow passageway 28 passes through the perforations of the screen 32.

Figure 3:
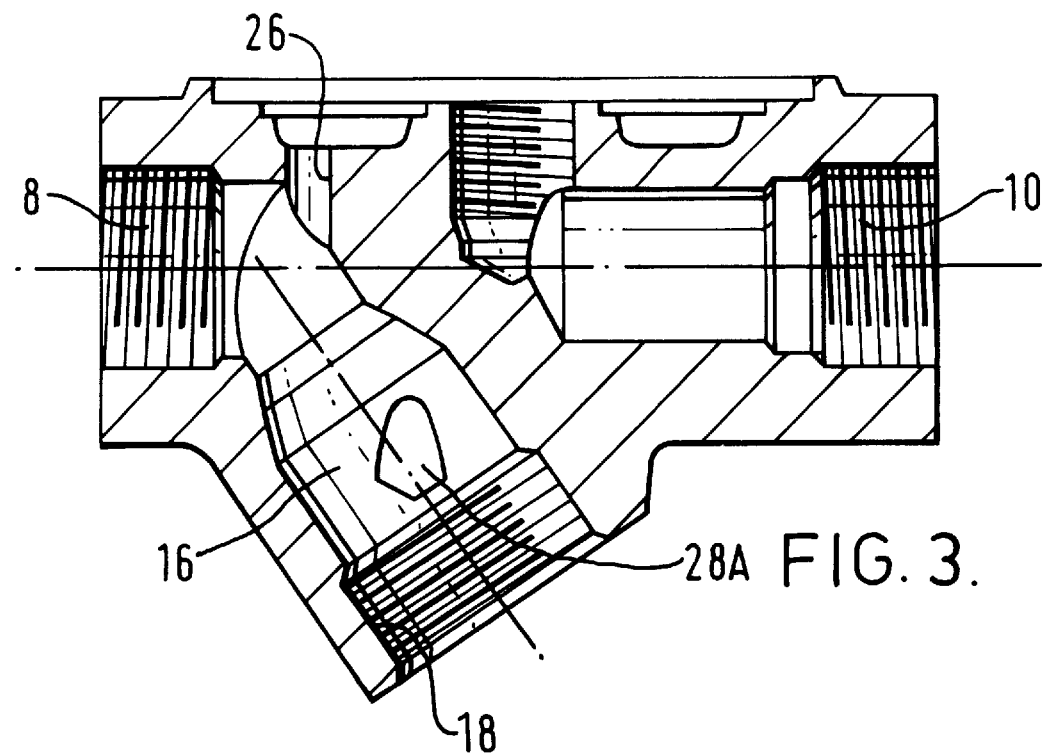
FIG. 3 is a sectional view taken on the line III—III in FIG. 2.

In addition, as compared with the embodiment of FIGS. 1 to 3, the first passageway 26 is smaller in diameter in the embodiment of FIG. 4. For example, in the embodiment of FIG. 4, the diameter of the passageway 26 may be approximately 3.5 mm. It has been found desirable for the ratio of the flow cross-sections of the first passageway 26 and of the second passageways 28 to be less than 50% and preferably less than 25%.

In operation, the perforations in the screen 32 serve to damp flow through the second passageway 28 so as to maintain a stable condensate surface in the sensor chamber 16. This avoid rapid fluctuations in the output of the sensor 22. The screen 32 serves to increase the pressure drop between the inlet 8 and the secondary passageways 28. This improves the sensitivity of the device, so producing an increased condensate level change in the sensor chamber 16 if the trap fails to close properly.

Because the screen 32 is cylindrical, it is able to seat properly against the wall of the tapered region 16B and against the sensor 22 without requiring modification of these components.

I claim:

1. A condensate trap comprising a trap chamber having an outlet controlled by a valve, a sensor chamber having an inlet, a first passageway providing communication between the sensor chamber and the trap chamber, the first passageway opening into the sensor chamber at a first port in an upper region of the sensor chamber, at least one second passageway providing communication between the sensor chamber and the trap chamber, the at least one second passageway opening into the sensor chamber at least one second port situated in the sensor chamber at a lower level than the first port, a sensor being provided which has a sensor element situated within the sensor chamber at a level which is not lower than the lowest part of the at least one second port, wherein the first and second passageways open into the trap chamber at separate locations from each other.

2. A condensate trap as claimed in claim 1, wherein the sensor chamber is situated directly below the trap chamber in normal use of the condensate trap.

3. A condensate trap as claimed in claim 1, wherein the inlet, the outlet, the first and second passageways and the sensor chamber are provided in a common body.

4. A condensate trap as claimed in claim 3, wherein the sensor chamber comprises a recess in the body, whereby the body forms the wall of the sensor chamber, the first and second ports being provided in the wall of the sensor chamber.

5. A condensate trap as claimed in claim 3, wherein the body has a surface region enclosed by a cap which is mounted on the body to define the trap chamber, the first and second passageways opening into the trap chamber at that surface region.

6. A condensate trap as claimed in claim 1, wherein the inlet and the outlet comprise inlet and outlet passages which are aligned with each other, the sensor chamber being generally cylindrical and being aligned with its axis intersecting at an acute angle the common axis of the inlet and outlet passages.

7. A condensate trap as claimed in claim 1, wherein a perforated screen is provided in the sensor chamber in the flow path between the inlet and the at least one second port.

8. A condensate trap as claimed in claim 7 wherein the screen is positioned in the sensor chamber such that all flow from the inlet to the at least one second passageway passes through the screen.

9. A condensate trap as claimed in claim 7, wherein the screen is cylindrical, the sensor element lying within the screen.

10. A condensate trap as claimed in claim 1, wherein the minimum cross-sectional area of the first passageway is not greater than 50% of the aggregate cross-sectional area of the at least one second passageway.

11. A condensate trap as claimed in claim 1, wherein the minimum cross-sectional area of the first passageway is not greater than 25% of the aggregate cross-sectional area of the at least one second passageway.

12. A condensate trap comprising a trap chamber having an outlet controlled by a valve, a sensor chamber having an inlet, a first passageway providing communication between the sensor chamber and the trap chamber, the first passageway opening into the sensor chamber at a first port in an upper region of the sensor chamber, at least one second passageway providing communication between the sensor chamber and the trap chamber, the at least one second passageway opening into the sensor chamber at at least one second port situated in the sensor chamber at a lower level than the first port, a sensor being provided which has a sensor element situated within the sensor chamber at a level which is not lower than the lowest part of the at least one second port, and a perforated screen provided in the sensor chamber in the flow path between the inlet and each said at least one second port.

13. A condensate trap as claimed in claim 12, wherein the sensor chamber is situated directly below the trap chamber in normal use of the condensate trap.

14. A condensate trap as claimed in a claim 12, wherein the inlet, the outlet, the first and second passageways and the sensor chamber are provided in a common body.

15. A condensate trap as claimed in claim 14, wherein the sensor chamber comprises a recess in the body, whereby the body forms the wall of the sensor chamber comprises a recess in the body, whereby the body forms the wall of the sensor chamber, the first and second ports being provided in the wall of the sensor chamber.

16. A condensate trap as claimed in claim 14, wherein the body has a surface region enclosed by a cap which is mounted on the body to define the trap chamber, the first and second passageways opening into the trap chamber at the surface region.

17. A condensate trap as claimed in claim 12, wherein the inlet and the outlet comprise inlet and outlet passages which are aligned with each other, the sensor chamber being generally cylindrical and being aligned with its axis intersecting at an acute angle a common axis of the inlet and outlet.

18. A condensate trap as claimed in claim 12, wherein the screen is positioned in the sensor chamber such that all flow from the inlet to the at least one second passageway passes through the screen.

19. A condensate trap as claimed in claim 12, wherein the screen is cylindrical, the sensor element lying within the screen.

20. A condensate trap as claimed in claim 12, wherein the minimum cross-sectional area of the first passageway is not greater than 50% of the aggregate cross-sectional area of the at least one second passageway.

21. A condensate trap as claimed in claim 12, wherein the minimum cross-sectional area of the first passageway is not greater than 25% of the aggregate cross-sectional area of the at least one second passageway.

* * * * *